Oct. 1, 1963   A. C. ANDERSON   3,105,786
METHOD OF FORMING A FIBER-REINFORCED RESINOUS SPOOL
Filed May 5, 1960

INVENTOR.
ARCHIE C. ANDERSON
BY
Andrus & Starke
Attorneys

United States Patent Office 3,105,786
Patented Oct. 1, 1963

3,105,786
METHOD OF FORMING A FIBER-REINFORCED RESINOUS SPOOL
Archie C. Anderson, Milwaukee, Wis., assignor to A. O. Smith Corporation, Milwaukee, Wis., a corporation of New York
Filed May 5, 1960, Ser. No. 27,018
5 Claims. (Cl. 156—173)

This invention relates to a method of forming reinforced plastic spools and more particularly to a continuous operation for forming spools from resin impregnated filamentary material.

Spools are generally formed in molding operations or by assembling molded or laminated ends on a central sleeve or core. The present invention is directed to a continuous process for forming spools in which long, substantially continuous fibers impregnated or coated with a resin are employed to fabricate the spools. More specifically, a strand of fibers impregnated with a thermosetting resin is helically wound about a mandrel in a number of superimposed layers to form a tube which serves as the sleeve or core for the spool. A series of split rings are secured in spaced relation to the outer surface of the tube, and a fiber strand impregnated with resin is then wound between the end surfaces of adjacent rings to provide the end members for spool. The resin is then cured, and the rings are removed from the cured structure to provide the completed spool.

The method of the invention provides a rapid and efficient operation for forming spools from fibrous material. The spools are formed in a continuous operation so that handling and assembling of separate elements is eliminated.

The spool of the invention has a central core reinforced with helically wound fibrous material, and the ends of the spool are also reinforced with circumferentially disposed fibers. This results in a spool which is particularly adaptable for heavy duty applications.

Other objects and advantages will appear in the course of the following description.

The drawings illustrate the best mode presently contemplated of carrying out the invention.

The spool formed by the method of the invention comprises a central sleeve or core 1 and a pair of end members 2 which are secured to the ends of the core.

The spool is fabricated by initially winding a fibrous strand 3 impregnated with a resin about a mandrel in a generally helical pattern. The strand 3 is wound in a series of superimposed layers with each layer having generally the opposite helix angle from the adjacent layers.

The strand 3 is preferably formed of long substantially continuous fibers and the fibers may take the form of ceramic fibers such as glass or asbestos; synthetic fibers such as nylon, Orlon (a polymer of acrylonitrile), Dacron, a polyester fiber produced by the condensation of terephthalic acid and ethylene glycol, rayon; animal or vegetable fibers and the like. The term strand is intended to include any bundle, ribbon, tape, yarn or the like of substantially continuous fibers which are uni-directional, intertwined, interwoven, or the like. The resin used in impregnating the fibers may be any of the conventional thermosetting resins generally used in laminating and winding procedures such as a polyester, epoxide, urea, melamine, or the like. In some cases where rigidity is not a prime requirement, thermoplastic resins such as polyvinyl chloride can be used.

Figure 3:
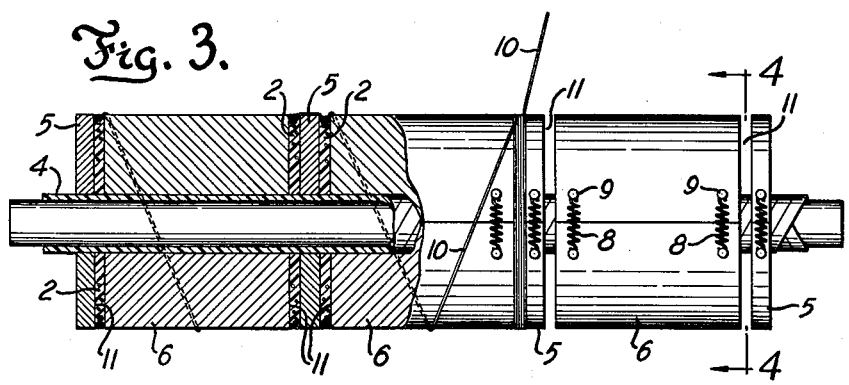
FIG. 3 is a view showing a series of rings and discs secured to the tube with the fiber strand being wound between the adjacent end surfaces of the rings and discs.
Figure 4:
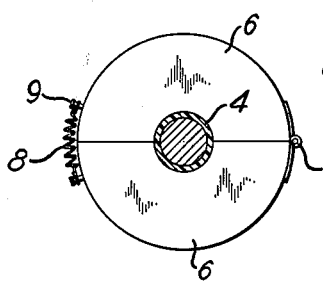
FIG. 4 is a transverse section taken along line 4—4 of FIG. 3.

After the strand 3 has been wound in the desired number of layers to provide a tubular article 4 with the desired strength requirements, a series of discs 5 and rings 6 are secured in spaced relation on the outer surface of tube 4. In the fabrication of a spool, each ring 6 can be considered a central form and the adjacent discs 5 end forms. As shown in FIG. 3, the end surfaces or faces of ring 6 are generally flat, and the opposite surfaces or faces of the discs 5 are also flat. The discs 5 and the rings 6 can be secured to the tube in any desired manner, and as shown in the drawings, the discs and rings are each formed in two longitudinally split sections which are hinged together at 7. A spring 8 is secured to one of the sections and is adapted to engage a hook 9 located on the other section to resiliently and firmly hold the sections to the tube 4.

A fiber strand 10 impregnated with a thermosetting resin is wound in the spaces 11 between the end surfaces of adjacent rings and discs to form the end members 2 of the spool. The strand 10 is similar in nature to strand 3 and is initially wound in the space 11 between the end surface of the first disc in the series and the adjacent ring 6. After the space has been filled with the windings, the strand 10 is moved across the outer surface of the adjacent ring and the winding is continued within the space between the end surface of that ring and the next disc.

After the strand has been wound flush with the outer surface of the disc, the strand is again moved to the next succeeding space 11 and this procedure is continued until the strand has been wound in each of the spaces 11 throughout the length of the tube 4. Alternately, individual strands 10 can be wound in each of the spaces 11.

After the winding has been completed, the resin is cured preferably by heating the entire article to provide a strong, rigid structure. The portions of the strand 10 extending over the peripheral surface of the rings 6 and discs 5 are then severed and the rings and discs are removed from the tube 4 by disengagement of the springs 8 from the hooks 9.

Figure 1:
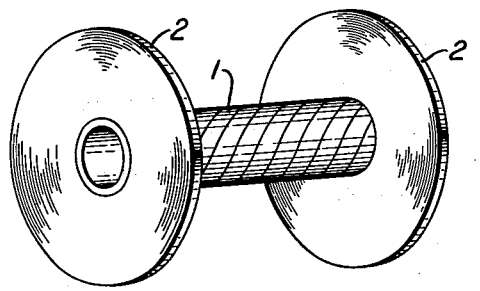
FIGURE 1 is a perspective view of the completed spool formed by the method of the invention.
Figure 2:
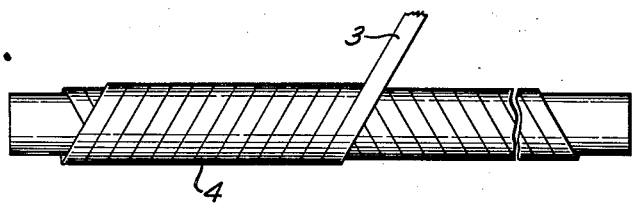
FIG. 2 is a diagrammatic view showing the central tube being wound from fibrous material.

After removal of the discs and rings, the mandrel is stripped or withdrawn from the tube and tube 4 is cut or severed at the former locations or positions of the discs 5 to thereby cut the composite structure into a series of spools, as shown in FIGURE 1.

The present invention provides a simple and efficient way of forming spools by a continuous winding operation. The tube 4 which serves as the central core 1 of the spools can be formed in any desired length so that a substantial number of spools can be formed on a single tube 4 in a single winding operation.

As both the core 1 and the end members 2 of the spool have improved strength they are particularly adaptable for applications where insulating and high strength characteristics are required.

Various modes of carrying out the invention are contemplated as being within the scope of the following claims particularly pointing out and distinctly claiming the subject matter which is regarded as the invention.

I claim:
1. A method of fabricating a reinforced resinous spool having a tubular core and a pair of spaced end members extending outwardly from the core, comprising applying fibrous material coated with a resin binder on a man- drel to form the tubular core, disposing an annular central form on the outer surface of the tubular core, disposing an annular end form on the tubular core on either side of said central form with the end surfaces of the end forms being spaced from the corresponding end surfaces of the central form to provide clearances therebetween, winding a strand of fibrous material coated with a resin within the clearances to form the end members of the spool, and removing the forms from the tubular core and stripping the tubular core from the mandrel to complete the operation.

2. A method of forming a fiber reinforced spool in a continuous winding operation, comprising winding a strand of substantially continuous fibers impregnated with a thermosetting resin on a mandrel in a series of superimposed layers to form a tubular member, disposing an annular central form on the outer surface of the tubular member, disposing an annular end form on the tublar member on either side of the central form with the end surface of each end form being spaced from the respective end surface of the central form to provide a clearance therebetween, winding a strand of substantially continuous fibers impregnated with a thermosetting resin in the clearances to form the end members of the spool, curing the resin to provide a hard rigid structure, and removing the forms from the tubular member and stripping the tubular member from the mandrel to complete the operation.

3. A method of forming a spool, comprising winding a strand of fibrous material impregnated with a thermosetting resin on a mandrel to form a tubular member, disposing a generally cylindrical central form coaxially on the outer surface of the tubular member with the central form having a pair of generally flat end surfaces, disposing a pair of end forms coaxially on the tubular member on either side of the central form with the end surfaces of the end forms adjacent said central form being generally flat and being spaced from the respective end surfaces of the central form to provide clearances therebetween, winding a strand of fibrous material impregnated with a thermosetting resin within the clearances to form the end members of the spool, and curing the resin to form a rigid structure in which the end members are bonded to the tubular member.

4. In a method of forming a spool, the steps of winding a strand of substantially continuous fibers impregnated with a thermosetting resin on a mandrel to form a tubular member, positioning a generally cylindrical longitudinally split central form on the outer surface of the tubular member, positioning a pair of generally cylindrical longitudinally split end forms on the tubular member on either side of the central form with the end surfaces of the end form being spaced from the respective end surfaces of the central form to provide clearances therebetween, winding a strand of substantially continuous fibrous material impregnated with a thermosetting resin within one of said clearances and continuing the winding until the fibrous material is substantially flush with the outer surface of said central form to provide a first end member for the spool, moving the fibrous material over the outer surface of the central form to the other of said clearances, and continuing the winding within the other clearance until the strand is substantially flush with the outer surface of the central form to provide the second end member for the spool.

5. A method of forming a series of fiber reinforced plastic spools, comprising winding a strand of fibrous material impregnated with a resin on a mandrel to form a tubular member, disposing a series of generally cylindrical forms on the outer surface of the tubular member with the end surface of each form being spaced from the end surface of adjacent forms to provide a series of clearances, winding a fibrous strand impregnated with a resin in one of said clearances and continuing the winding until the strand is substantially flush with the outer surface of the adjacent cylindrical form, moving the fibrous strand to the next succeeding clearance and continuing the winding of said strand within said next clearance until the winding is substantially flush with the outer surface of the next adjacent cylindrical form, repeating the steps of winding the strand across the outer surface of the form and winding the strand in the next succeeding clearance until the strand has been wound in each of said clearances, curing the resin to provide a strong rigid article, severing the fibrous strand adjacent the clearances to provide a series of spools, removing the cylindrical forms from the tubular member, and stripping the mandrel from said tubular member to complete the operation.

References Cited in the file of this patent
UNITED STATES PATENTS

| | | |
|---|---|---|
| 1,236,357 | Reeve | Aug. 7, 1917 |
| 2,221,470 | Brown | Nov. 12, 1940 |
| 2,432,270 | Asbill | Dec. 9, 1947 |
| 2,732,817 | Robinson | Jan. 31, 1956 |
| 2,987,217 | Reed | June 6, 1961 |
| 2,991,210 | Matkovitch | July 4, 1961 |